United States Patent [19]

Cwik

[11] Patent Number: 4,470,718

[45] Date of Patent: Sep. 11, 1984

[54] JOINING DEVICE

[75] Inventor: Norbert L. Cwik, Northfield, Ill.

[73] Assignee: Quaker Industries, Inc., Antioch, Ill.

[21] Appl. No.: 371,949

[22] Filed: Apr. 26, 1982

[51] Int. Cl.³ .............................................. B25G 3/36
[52] U.S. Cl. ...................................... 403/402; 52/656
[58] Field of Search ............... 403/401, 402, 217, 218, 403/171, 172, 174, 176, 178, 187, 189; 52/656, 783, 823

[56] References Cited

U.S. PATENT DOCUMENTS 4,124,322 11/1978 Parisien ............................ 403/401 X
4,127,347 11/1978 Pritchard ............................ 403/402
4,240,765 12/1980 Offterdinger ....................... 403/402
4,368,584 1/1983 Logan .................................. 403/401

Primary Examiner—Andrew V. Kundrat
Attorney, Agent, or Firm—Trexler, Bushnell & Wolters, Ltd.

[57] ABSTRACT

An integrally formed joining device is disclosed. The joining device comprises a first and a second backing member portion and a bracing member portion interposed therebetween. The bracing member portion is integrally formed respectively with each of the first and the second backing member portions. The bracing member portion defines a continuous and curved edge for the joining device.

5 Claims, 12 Drawing Figures

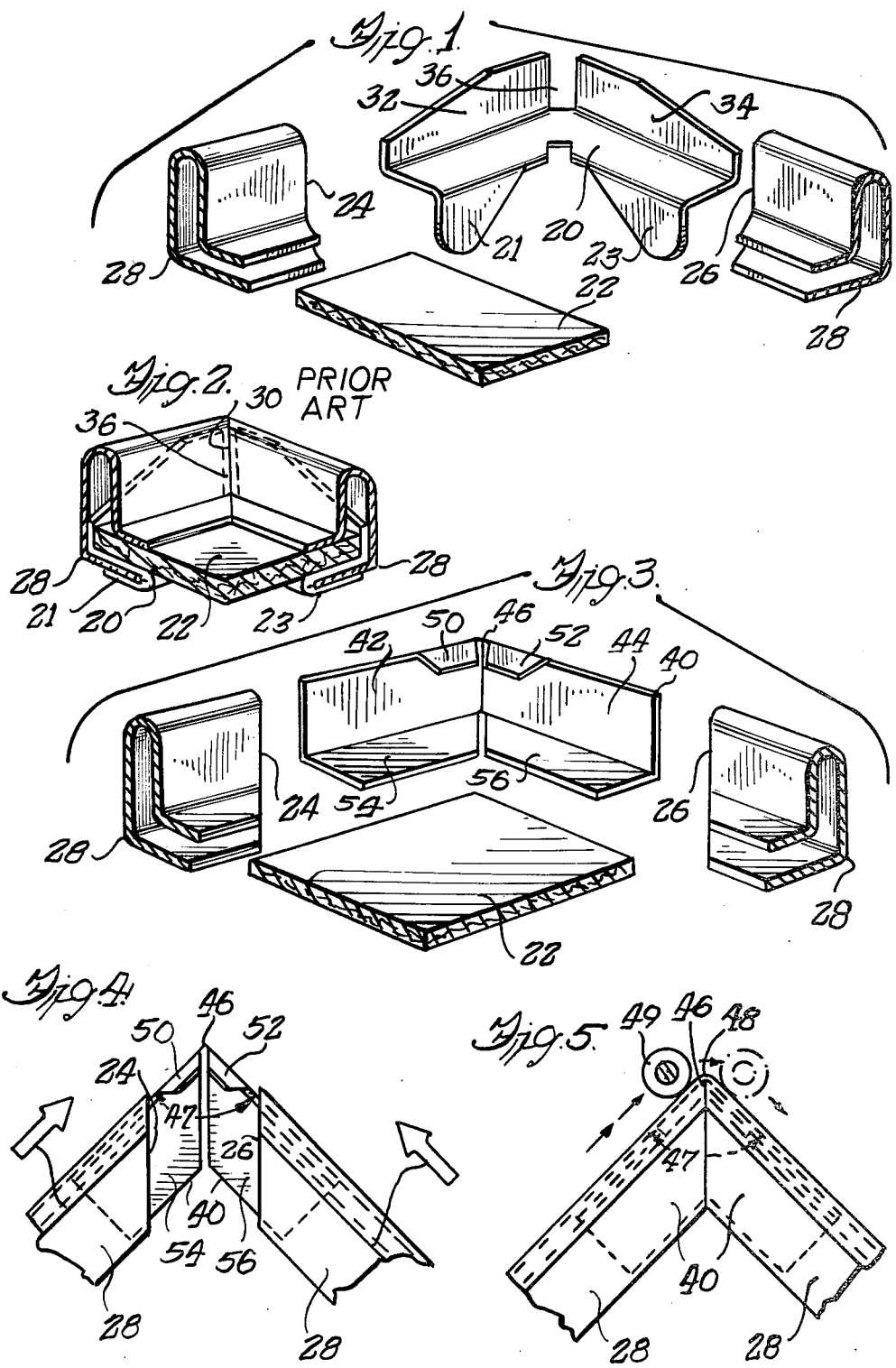

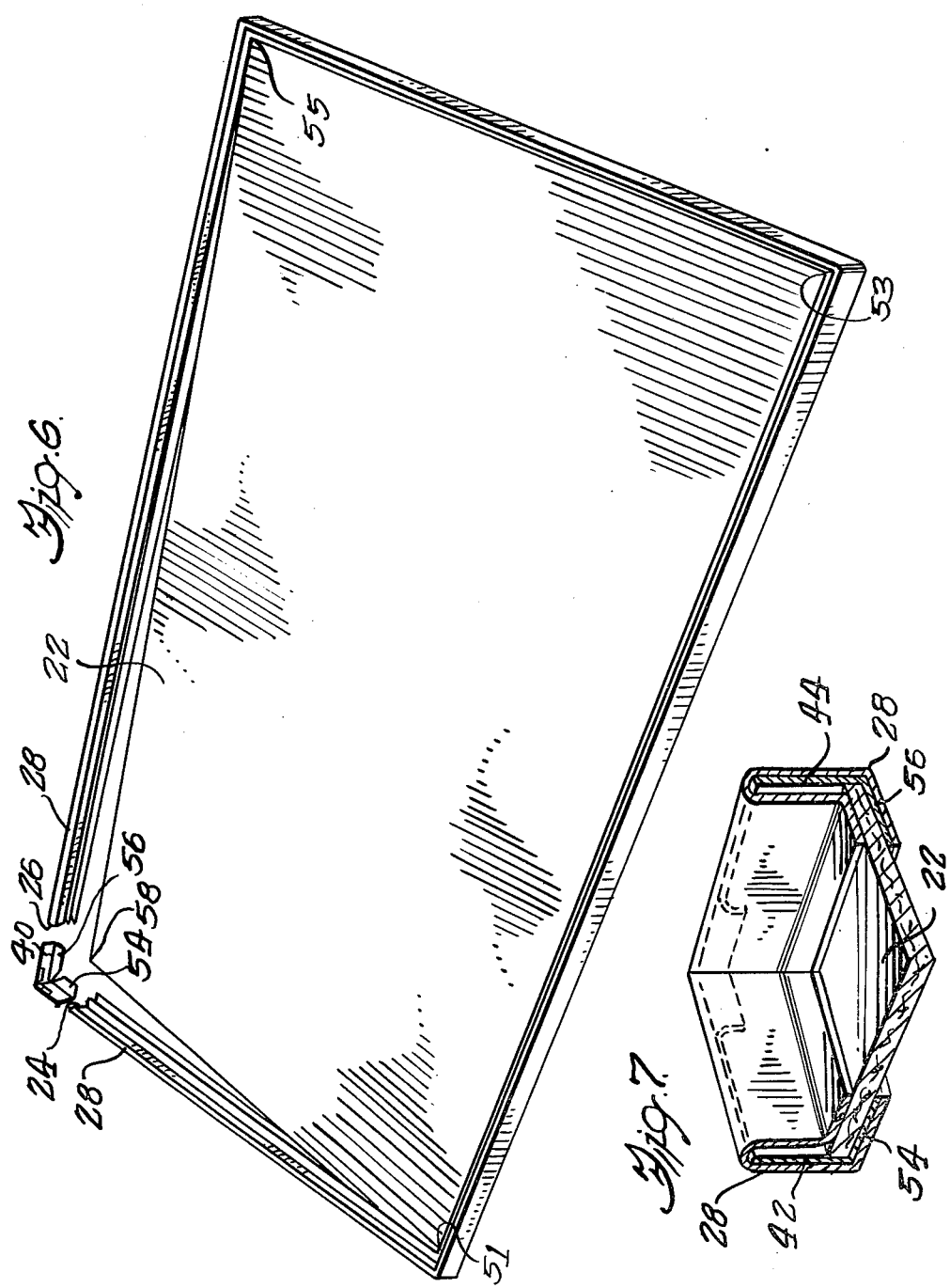

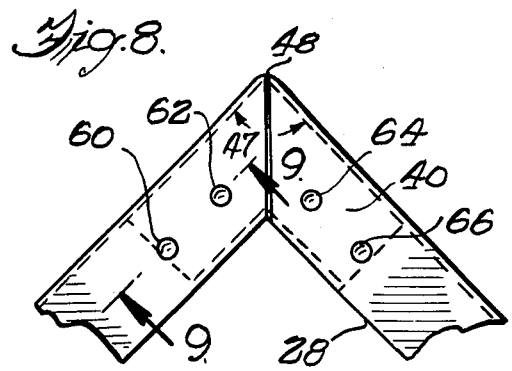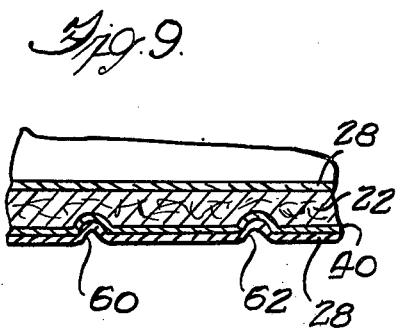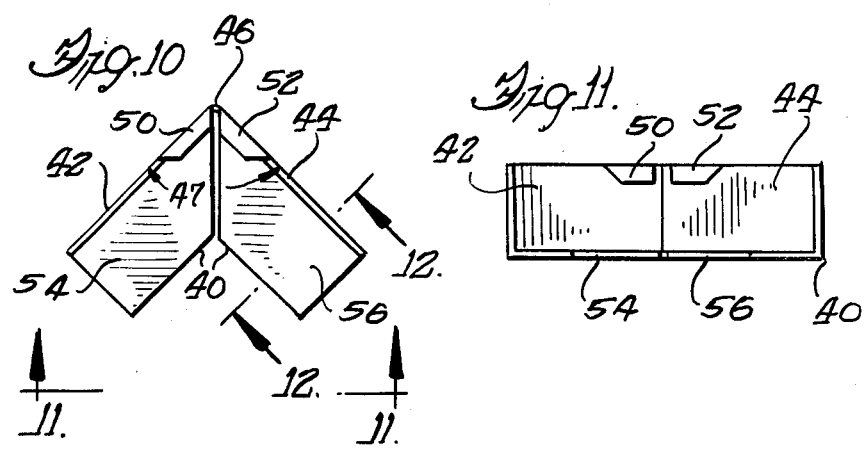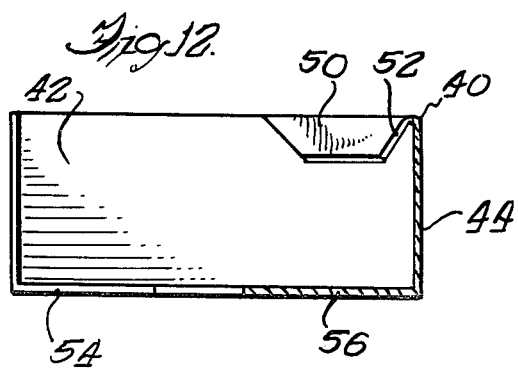

JOINING DEVICE

BACKGROUND OF THE INVENTION

This invention is directed to a novel joining device, and more particularly to a novel joining device which is used to join together the free ends of a peripheral molding.

Molding serves a protective purpose, a decorative purpose or both, when it is carried peripherally around such things as picture frames, tray tables or other items of furniture. The free ends of such a molding usually are joined or otherwise held together by a joining device. A structural or support surface of the furniture carries the joining device upon an outwardly extending corner portion thereof. The structural or support surface of the furniture also carries the molding along the peripheral edge thereof.

A first problem encountered with use of such a joining device involves proper alignment of the joining device together with proper alignment of the end portions of the molding at the outwardly extending corner portion of the structural or support surface.

Joining together the free ends of such a molding often presents an additional problem, particularly when the molding is made of metal, namely, the free ends often have sharp edges. Moreover, the free ends often do not fit together precisely. Consequently, the joined ends provide the molding with an outwardly extending edge which is usually rough or jagged. Such an edge is often the cause of damage to property or injury to people.

Conventional joining devices or corner clips do not fully address the foregoing problems.

OBJECTS AND SUMMARY OF THE INVENTION

Accordingly, it is a general object of this invention to provide a novel joining device which avoids the problems of the prior art when joining together the free ends of a peripheral molding.

A more specific object is to provide a novel joining device which permits cooperative association among or between the novel joining device, the free ends of a peripheral molding, and a portion of a support structure; and which additionally permits cooperative alignment of all of these at an outwardly extending edge portion of such a structure.

Yet another object is to provide a novel joining device which cooperates with such a molding to permit both alignment and rounding or smoothing of such joined ends.

Briefly, and in accordance with the foregoing objects, an intergrally formed joining device, according to the invention, comprises a first and a second backing member and a bracing member interposed therebetween. The bracing member is integrally formed respectively with each of the backing members. The bracing member defines a continuous and curved outer edge for the integrally formed joining device.

BRIEF DESCRIPTION OF THE DRAWINGS

The foregoing, as well as other objects, features and advantages of the invention, will become more readily understandable upon reading the following detailed description of the illustrated embodiment, together with reference to the drawings, wherein:

FIG. 1 is a partially exploded perspective view illustrating a prior art joining device, the free ends of a piece of a peripheral molding, and a portion of a structural surface;

FIG. 2 is an assembled perspective view of the prior art joining device of FIG. 1;

FIG. 3 is a partially exploded perspective view illustrating the joining device of the present invention, the free ends of a piece of a peripheral molding, and a portion of a structural surface;

FIG. 4 is a top view illustrating the telescopic interposition of the joining device of the present invention between free ends of the peripheral molding;

FIG. 5 is a top view illustrating the use of a smoothing device or rolling tool with the joining device of the present invention;

FIG. 6 is a partially exploded perspective view illustrating use of the joining device of the present invention, in conjunction with the free ends of a peripheral molding and an associated item of furniture, such as a tray table;

FIG. 7 is an assembled perspective view of the joining device of the present invention illustrating resultant cooperation of the invention with the joined ends of a molding and a structural surface at an outwardly extending corner portion of the surface;

FIG. 8 is a bottom view illustrating use of a preferred arrangement for securing the molding and the joining device of the present invention in assembled relation with the support structure;

FIG. 9 is a partial sectional view of the molding, taken substantially along the line 9—9 in FIG. 8;

FIG. 10 is a top view of a preferred form of the joining device of the present invention;

FIG. 11 is a frontal view, taken substantially along the line 11—11 in FIG. 10; and, FIG. 12 is a side view, taken substantially along the line 12—12 in FIG. 10.

Throughout the drawings, like reference numerals refer to like parts.

DETAILED DESCRIPTION OF THE ILLUSTRATED EMBODIMENT

Firstly, considering FIGS. 1 and 2, a prior art joining device 20 is illustrated. This prior art device 20 is interposed between a support structure or a supporting member 22 and a peripheral molding 28 and is used to join together free ends 24, 26 of the molding 28. Unfortunately, the prior art device 20 provides no support to the molding 28 at an outwardly extending edge 30 which results from the joining of the free ends 24, 26. Such lack of support exists because a pair of respective first and second backing members 32, 34 of the prior art joining device 20 are not formed entirely continuous to or integral with each other. More particularly, such lack of support is encountered because of the presence of a gap or a void space 36 which is located between the first and the second backing members 32, 34 at an outwardly extending edge portion of the prior art device 20. A smoothing or a rounding tool applying an impact force along the outwardly extending corner 30 of the molding 28, therefore, will not be very effective, mainly because of the presence of the gap or void space 36 of the prior art device 20.

To assist the joining together of the free ends 24, 26 of the molding 28 at the outwardly extending edge 30, the prior art device 20 provides a pair of folded-over ears 21, 23, such as those illustrated in FIGS. 1 and 2. The ears 21, 23, of the prior art device 20 provide for securement of the prior art device 20 to portions of the molding 28. The ears 21, 23, however, provide no support at the outwardly extending edge or corner 30 of the molding 28.

The novel joining device 40 of the present invention, however, overcomes the foregoing problems. An anvil-like feature of the novel joining device 40 of the present invention permits use of a smoothing device or a rolling tool 49, as illustrated in FIG. 5, to roll over and thereby round off the outwardly extending edge 30 formed at the joined ends 24, 26 of the molding 28. When such a tool is used in such a manner, a bracing member portion 46 of the joining device 40 is positioned against a backside of the outwardly extending edge 30 of the joined ends 24, 26 of the molding 28. Such backside positioning provides an anvil, and the smoothing device or rolling tool 49 then is rolled over the exposed side of the molding 28.

Turning now to the remainder of the figures, the anvil-like feature and other features of the joining device 40 of the present invention will now be discussed.

FIGS. 3 and 7 are views, similar to the views of FIGS. 1 and 2, respectively. FIGS. 3 and 7 illustrate an exploded and an assembled perspective view taken from an inner corner of the joining device 40 of the present invention. A first and a second backing member portion 42, 44 of the joining device 40 of the present invention have integrally formed therebetween the continuously curved bracing member portion 46. Accordingly, this bracing member 46 joins together the first and the second backing members 42, 44 and provides an anvil-like backing or like supportive structure for the joining ends 24, 26 of the molding 28.

Hence, the bracing member 46, provides a form against which the free ends 24, 26 of the molding 28 can be pressed during assembly. Such use of the bracing member 46 permits not only precise alignment of the ends 24, 26 of the molding 28, but also allows the smoothing over of any sharp protrusions of the molding 28 at the outwardly extending edge 30, thus avoiding sharp or protruding imperfections.

As illustrated in FIGS. 4, 5, 8 and 10, a predetermined angle 47 is defined between the first and the second backing members 42, 44 of the joining device 40 of the present invention. In the illustrated embodiment, this predetermined angle 47 is substantially 90 degrees. Accordingly, when the free ends, 24, 26 of the molding 28 are brought together with the novel joining device 40 interposed therebetween, as illustrated in FIG. 4, the bracing member portion 46 advantageously provides an anvil-like support behind a pair of outer edges 48, of the free ends 24, 26. Such anvil-like support permits use of an appropriate smoothing device or rolling tool 49, as illustrated in FIG. 5, to smooth over or to round out these outer edges 48. Other means, of course, may be utilized to smooth over the outer edges 48, without departing from the invention. For example, an impact device, such as a hammer, might be more commercially practical or convenient than what is illustrated in FIG. 5.

As illustrated in FIGS. 3, 10, 11 and 12, the novel joining device 40 includes a first pair of wings 50, 52. Each of these wings 50, 52 in integral with and depends at a slight inclination (see FIG. 3) from a respective upper portion of the first and the second backing member portions 42, 44 of the novel joining device 40. This first pair of wings 50, 52 increases the frictional surface of the novel joining device 40 and thereby holds the novel joining device 40 to an interior surface of the molding 28.

Referring now to the preferred embodiment, as illustrated in FIGS. 3, 4, 6 and 7, the novel joining device 40 will be seen to include a second pair of wings 54, 56. Each of these latter wings 54, 56 is integral with and extends from a respective lower portion of the first and the second backing member portions 42, 44. The second pair of wings 54, 56 provides the novel joining device 40 with another frictional surface which is interposed between a portion of the interior surface of the molding 28 and a portion of a support structure or a structural surface 22, such as an edge of a piece of furniture.

In addition, the second pair of wings 54, 56 provides a surface to which a portion of the structural surface 22 or a portion of the peripheral molding 28 can be secured. Lastly, because each of the second pair of wings 54, 56 is integral with a respective backing member 42, 44 of the novel joining device 40, structural rigidity or upwardly oriented support for the backing members 42, 44 of the novel joining device 40 is thereby provided. All of these features of the second pair of wings 54, 56 advantageously allow for snug cooperation between the joining device 40, and certain portions of both the peripheral molding 28 and the support structure 22.

The inclusion of such added frictional surfaces, such as is provided by the inclusion of the first pair of wings, 50, 52 and the second pair of wings 54, 56, advantageously permits snug and binding engagement and adhering cooperation among the novel joining device 40, the free end portions 24, 26 of the molding 28, and an outer edge portion of the support structure 22. But more particularly, the added frictional surfaces advantageously encourage substantial alignment and snug engagement of the outer edges 48 of the molding end portions 24, 26 with an outer corner 58 of the support structure 22, with the bracing member portion 46 of the novel joining device 40 firmly held therebetween, substantially as illustrated in FIGS. 6 and 7. A particularly useful application for such interposition and engagement is in the manufacture of snack or tray tables, as illustrated in FIG. 6.

The steps whereby the joining device is used for joining the free ends 24, 26 of a one-piece molding 28 which is engaging peripherally around a piece of a support structure 22, are as follows. The piece of the support structure 22 first is cut to the appropriate dimensions for a desired application, such as to provide a surface for a tray or snack table, as illustrated in FIG. 6. Next, a piece of edge molding 28 is cut to be sufficient in length so as to fit snugly around the periphery of the support structure 22. This is done by substantially matching the length of the one-piece molding 28 to the periphery of the support structure 22.

The piece of support structure 22 is then secured for further assembly. Then, an end 24, 26 of the molding 28 is aligned adjacent to an outwardly extending corner 58 of the support surface or structure 22. Next, the molding 28 is suitably adapted to negotiate a peripheral discontinuity 51, 53, 55 of the support structure 22, if any such adaptation is necessary. One such method of suitable adaptation is by notching the molding 28 and removing portions therefrom where the peripheral discontinuity 51, 53 and 55 must be negotiated along the perimeter or periphery of the support structure 22.

The periphery of the support structure 22 next is engaged within the inner portion of the molding 28, with the free ends 24, 26 of the molding 28 pried back slightly from the corner 58 of the support structure 22 to permit later insertion therein of the novel joining device 40. Then, the novel joining device 40 is placed upon the support structure 22 at the corner 58, as illustrated in FIG. 6. The joining device 40 is oriented upon the support structure 22 at the corner 58 so that the first and the second backing members 42, 44 can be inserted within inner portions of the molding 28, as illustrated in FIG. 3. The end portions 24, 26 of the molding 28 are then brought together at the bracing member portion 46 of the joining device 40, as illustrated in FIG. 4. Thereafter, a rounding tool 49 or other appropriate impact device is used (where the end portions 24, 26 are brought together) for smoothing out imperfections present at the outer edges 48 of the molding 28, as illustrated in FIG. 5.

Turning lastly to FIGS. 8 and 9, it can be appreciated that an appropriate portion of the molding 28 can be adapted further to secure the molding 28 to the novel joining device 40. Such adaptation can include incorporation of mechanical fastening means. The preferred method of additionally securing the molding 28 to the novel joining device 40 contemplates formation of a plurality of dimples 60, 62, 64 and 66, following the assembly of the respective parts as discussed above. Formation of such dimples by a suitable tool (not shown) causes portions of the molding 28 and portions of the novel joining device 40 to become secured to the support structure 22. Such contemplated use of such dimples is generally illustrated in FIGS. 8 and 9.

What has been illustrated and described herein is a novel joining device. While the joining device of the present invention has been illustrated and described with reference to a preferred embodiment, the invention is not limited thereto. On the contrary, alternatives, changes or modifications may become apparent to those skilled in the art upon reading the foregoing description. Accordingly, such alternatives, changes or modifications are to be considered as forming a part of the invention insofar as they fall within the scope and spirit of the appended claims.

I claim:

1. In combination with a substantially planar panel having an edge periphery with corners, and a molding member formed in sections engageably surrounding said panel along said periphery thereof, said molding member sections each providing an inverted channel formation with inner and outer vertical side walls spaced apart a predetermined distance and a top interconnecting web portion and having an inwardly projecting horizontal flange at the bottom edge of the inner side wall spaced above an inwardly projecting horizontal flange at the bottom edge of the outer side wall for completing the engageable surrounding of the panel around the periphery thereof, and presenting juxtaposed end portions at each panel corner, an integrally formed corner joining device telescoped within the juxtaposed end portions of adjacent molding member sections and comprising a first generally vertical wall; a second generally vertical wall integral with and disposed substantially 90 degrees relative to said first wall with the vertical juncture therebetween forming an anvil surface therebetween, said first and second walls having upper and lower edges and including first wings integral therewith along said upper edges extending inwardly substantially transverse thereto in slight dependency therefrom and dimensioned to frictionally fit snugly between the side walls of adjacent molding member sections adjacent an included web portion, and second wings integral with said lower edges and extending inwardly substantially transverse thereto, said second wings lying between one pair of flanges on adjacent molding member sections and said panel and with the telescoped joining device thereby joining juxtaposed end portions at an included corner of said panel, with said anvil thereby providing a form surface against which said juxtaposed end portions of said molding member sections are press fitted for thereby causing said end portions to assume a similar shape to that of said anvil form, whereby substantially to reduce the degree of sharpness of said end portions thus joined to said panel at said corners thereof and to resist retrograde telescopic movement between the joining device and the molding member sections.

2. The combination of claim 1 wherein said anvil surface defines a continuous and curved edge of about 90 degrees intermediate said first and second walls, said anvil surface further being disposed about generally vertically relative to said joining device of said integrally formed joining device, for thereby providing said joining device with a continuously curved exterior edge surface.

3. The combination of claim 1 wherein wherein at least one of said first and second wings of each respective one of said first and second walls of said joining device is deformable for securing said joining device to said panel.

4. The combination of claim 1 wherein the anvil surface defines a surface curvature of substantially 90 degrees with the press fitted end portions substantially conforming to that surface curvature.

5. The combination of claim 4 wherein the wings at the upper and lower edges of the generally vertical walls of the joining device are separated from each other within and to each side of the said anvil surface.

* * * * *